INVENTOR.
August Benz

Patented July 31, 1951

2,562,256

UNITED STATES PATENT OFFICE 2,562,256

SPRING WITH BALL RETAINERS

August Benz, Portland, Oreg.

Application June 1, 1948, Serial No. 30,452

8 Claims. (Cl. 267—54)

My present invention relates to a leaf spring assembly for a vehicle, having particular reference to a dual axle vehicle such as a modern logging trailer by means of which heavy loads must be transported over difficult terrain. The principal object of the present invention is to provide a limber construction whereby each axle may move vertically independently of the other without losing alignment transversely of the trailer body.

The invention is of the greatest use in the type of vehicle wherein a pair of spaced axles are supported by a pair of longitudinally extending leaf spring assemblies mounted upon a trunnion shaft extending between and parallel to the axles. In such an assembly various means have been devised for fixing the leaf spring assembly to the trunnion shaft and for fixing the ends of the leaf spring assemblies to the axle shafts. All such prior art devices have been complicated and are subject to a great many drawbacks, principally due to the necessity for weakening the leaf springs to provide means for accommodating a fastening member as, for example, by drilling holes through the leaf springs for reception of a bolt or stud. Further problems are encountered due to the necessity for maintaining accurate alignment of the axles and trunnion shaft. Means have been provided for maintaining such alignment, such as by bending an end of one or more of the leaf springs. Bending and re-hardening not only weakens the material but is difficult to hold to definite dimensions. The present invention comprises means whereby the leaf springs are locked to each other and to housing members by virtue of hardened steel balls seated in depressions which may be accurately located without materially weakening or deforming the leaves.

A further object of the present invention is to provide housing means for attaching the end of a leaf spring assembly to an axle which permits adjustment of the longitudinal distance between a transverse trunnion shaft and the axle to all extents necessary to accommodate variations in individual vehicle bodies.

The foregoing and other objects and advantages of the present invention will be more readily apparent from inspection of the following specification taken in connection with the accompanying drawings wherein like numerals refer to like parts throughout, while the features of novelty will be more distinctly pointed out in the appended claims.

In the drawings—

Figure 1:
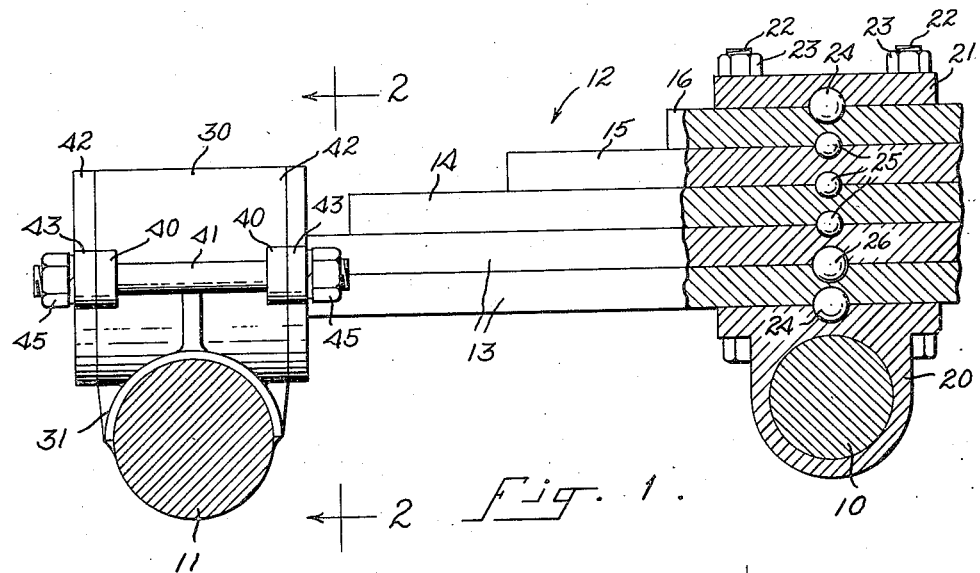
Fig. 1 is a side elevation of a portion of a leaf spring assembly mounted upon a trunnion shaft and an axle in accordance with the present invention, parts of the assembly being broken away to illustrate the invention.
Figure 2:
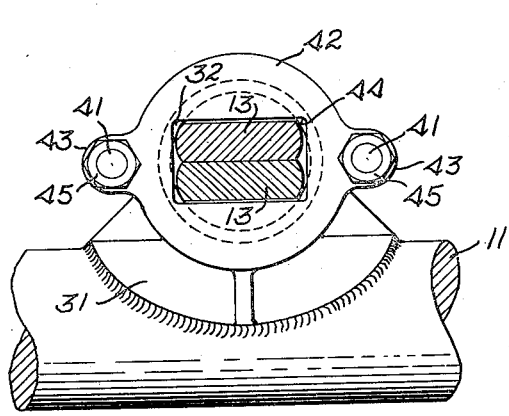
Fig. 2 is a vertical section taken substantially along line 2—2 of Fig. 1.
Figure 3:
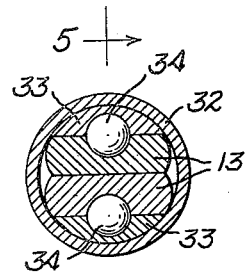
Fig. 3 is a partial side elevation of the end of a leaf spring assembly extending into a part of the end mounting therefor, said part being shown separate from the housing which attaches it to an axle.
Figure 4:
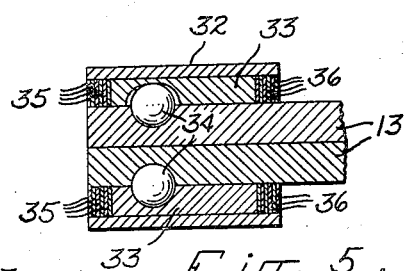
Fig. 4 is a vertical section taken substantially along line 4—4 of Fig. 3.
Figure 5:
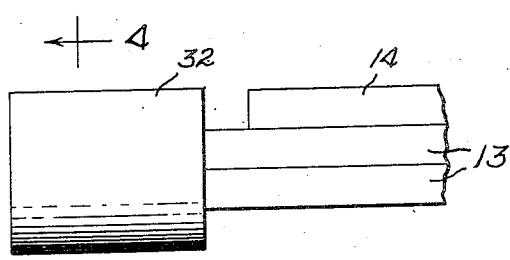
Fig. 5 is a vertical section taken substantially along line 5—5 of Fig. 4.

In the drawings the numeral 10 refers to a trunnion shaft as commonly encountered on dual axle vehicles of which one axle 11 is indicated. A leaf spring assembly 12 is mounted upon the trunnion shaft 10 and has its ends extending into housings fastened to the axles 11. The leaf spring assembly preferably comprises a lower pair of long spring leaves 13 of equal length and superimposed spring leaves 14, 15 and 16 of successively decreasing lengths. The number and lengths of the spring leaves may vary to suit individual vehicle requirements.

The leaf spring assembly is mounted upon the trunnion shaft 10 by a separable housing including a base 20 and a top plate 21, and the two being held together by bolts 22 and nuts 23. In order to lock the leaf spring assembly to the separable housing the lower spring leaf 13 and the upper spring leaf 16 are each provided with a central hemispherical cavity in which are seated a pair of steel balls 24, the depressions snugly embracing the surfaces of the balls. The other halves of the balls are seated in snugly fitting, hemispherical depressions in the adjacent surfaces of the housing parts 20 and 21. The depressions do not extend through the leaf springs and very little material is removed therefrom so that the leaf springs are not materially weakened by the locking members comprising the balls 24. In order to lock the remaining leaf springs to each other and to the outer leaf springs each is provided with hemispherical cavities in both surfaces in which are seated hardened steel balls 25 placed vertically in line with each other and with the balls 24 above the trunnion shaft 10. These balls may be of smaller diameter, since no longitudinal thrust is taken up thereby and the only purpose served is to prevent slippage between the leaf springs at their central points. Since some longitudinal thrust is taken up by the intermediate spring leaf 13, a steel ball 26 interposed between the leaf springs 13 is preferably of large diameter and substantially the same diameter as the balls 24. The bolts 22 are preferably spaced longitudinally of the leaf spring assembly to prevent side slipping of one leaf relative to the others.

In order to fasten the ends of the leaf spring assembly to the axles 11 means are provided whereby the ends of the leaf springs 13 are locked to the axle in such manner as to prevent longitudinal movement of the axle but to permit transverse rocking of the axle. The means herein illustrated comprise the preferred form wherein a cylindrical housing 30 is fixed to the axle 11 as by means of a saddle 31 which is welded to the lower surface of the housing and the upper surface of the axle, with the bore of the cylinder extending longitudinally of the vehicle or transversely of the axis of the axle. The cylinder is placed as close to the upper surface of the axle as possible so that a short moment arm is provided between the leaf spring assembly and the axis of the axle. A locking plate retainer 32 comprising a cylindrical sleeve is snugly embraced within the cylindrical housing 30, the sleeve being of the same length as the housing 30 and having an outer diameter just slightly less than the inner diameter of the housing. A pair of locking plates 33 in the shape of cylindrical segments are mounted in the spaces between the ends of the leaf springs 13 and the inner surface of the locking plate retainer 32. A hemispherical depression is provided in the outer surface of each leaf spring 13 as close to the end thereof as possible without eliminating other features of the invention, as will appear. Each locking plate 33 is provided with a matching depression in the surface adjacent the surface of the leaf spring and a pair of hardened steel balls 34 are seated in the spherical cavities so formed, preferably the balls being of large diameter but preferably not greater than a diameter equal to the thickness of the springs so that the depressions in the springs pass only to the midpoint thereof. The depressions in the springs are located inwardly from the ends thereof to an extent such that a substantial thickness of material is located between the ends of the springs and the outer surface of the steel balls 34. The depressions in the locking plates 33 are far enough removed from the outer ends of the plates that a substantial thickness of material remains to hold the balls in position, but the ends of the plates do not extend to the ends of the leaf spring assembly. Therefore, when the ends of the springs 13 are aligned with the end of the sleeve 32 spaces are provided within which a plurality of segmental shims 35 may be located. Similarly, the opposite ends of the locking plates terminate short of the opposite end of the cylindrical sleeve so that a plurality of segmental shims 36 may be positioned in the spaces so provided. It is to be noted that the depression in the lower locking plate 33 is semispherical so that the lower spring leaf 13 is locked to the lower locking plate. The depression in the upper locking plate is elongated axially of the leaf spring so that the upper spring leaf 13 may move longitudinally with respect to the locking plate 33 and the axle as the leaf spring assembly flexes. The width of the depression in the upper locking plate is equal to the diameter of the ball at its base, and the depression snugly embraces the ball transversely so that relative movement laterally is prevented. The spring assembly is thus allowed to function without interference from the upper ball 34. However, if the lower ball 34 should fracture, or if the cavity surrounding the same should become enlarged due to excess pounding, the upper cavity in the upper locking plate 33 will act as a safety retainer to prevent accidents.

The sleeve 32 is retained by the following means. A pair of ears 40 are provided at each end of the housing 30 and a pair of tie rods 41 pass therethrough. A pair of end caps 42 are provided to cover the ends of the cylindrical housing 30, each end cap having ears 43 matching ears 40 and a centrally located, rectangular opening 44 therein of sufficient size to permit relatively free passage of the leaf springs 13. The end caps are drawn tightly against the ends of the housing by nuts 45. The material of the end caps surrounding the central opening 44 is such as to retain the shims 35 and the sleeve 32 against endwise movement, thus preventing endwise movement of the balls 34 and the leaf springs 13. In the event that manufacturing inaccuracies have caused an accumulated error to be presented which would keep the axles from being aligned with each other and with the trunnion shaft 10, some of the shims 35 and 36 may be transposed.

With the foregoing assembly the leaf spring is firmly positioned in place and firmly retains the axles parallel to each other and to the trunnion shaft. Each axle may rock transversely by the rotation of the sleeve 32 within the housing 30, or by rotation of the leaves 13 within the sleeve 32. Therefore, no twisting force is applied to any of the leaf springs. None of the leaf springs are materially weakened and no loose play is allowed between any of the parts which might become enlarged by hammering of one part upon another.

Having illustrated and described a preferred embodiment of my invention, it should be apparent to those skilled in the art that the invention permits of modification in arrangement and detail. I claim as my invention all such modifications as come within the true spirit and scope of the appended claims.

1. Means for attaching a spring assembly to an axle, comprising a housing mounted on the axle and having a cylindrical bore therethrough extending transversely with respect to the axle and into which an end of the spring assembly projects, a cylindrical sleeve journaled in said bore, said end of the spring assembly having a depression therein, a locking member seated in said depression and having a portion projecting beyond the adjacent surface of the spring assembly, a locking plate having an inner surface in engagement with the spring assembly and an outer surface in engagement with the adjacent inner surface of said sleeve, said locking plate having a depression into which the projecting portion of said locking member protrudes, and separable means to retain said locking plate and sleeve in said housing.

2. Means for attaching the end of a leaf spring assembly to an axle, comprising a cylindrical housing mounted transversely on the axle and into which the end of the leaf spring assembly projects, a cylindrical sleeve journaled in said housing, the end of said spring assembly having a depression therein, a locking member seated in said depression and having a portion projecting beyond the adjacent surface of the spring assembly, a locking plate in the shape of a cylindrical segment journaled in said sleeve and having its flat surface in engagement with the end of the leaf spring assembly, said locking plate having a depression into which the projecting portion of said locking member protrudes, and means to prevent longitudinal movement of said locking plate with respect to said housing.

3. Means for attaching the end of a leaf spring assembly to an axle, comprising a cylindrical housing mounted on the axle into which the end of the leaf spring assembly projects, the end of said spring assembly having a semispherical depression therein, a locking ball seated in said depression, a locking plate in the shape of a cylindrical segment having its flat surface in engagement with the end of the leaf spring assembly, said locking plate having a depression into which said locking ball protrudes, and means to prevent longitudinal movement of said locking plate with respect to said housing comprising a pair of caps mounted one at each end of said cylindrical housing and having openings therethrough of a size to permit reception of said leaf spring assembly end.

4. Means for attaching the end of a leaf spring assembly to a vehicle shaft comprising a cylindrical housing fixed to said shaft, a cylindrical sleeve rotatably retained in said housing, the end of said leaf spring assembly projecting into said cylindrical sleeve, a pair of hardened steel balls seated in depressions in the opposite flat surfaces of said end of the leaf spring assembly, a pair of locking plates in the form of cylindrical segments seated in the spaces between said flat surfaces of the end of the leaf spring assembly and the adjacent inner surface of said cylindrical sleeve, each of said locking plates having depressions into which the protruding portions of said steel balls project, and means to retain said locking plates in said cylindrical sleeve.

5. Means for attaching the end of a leaf spring assembly to a vehicle shaft comprising a cylindrical housing fixed to said shaft, a cylindrical sleeve rotatably retained in said housing, the end of said leaf spring assembly projecting into said cylindrical sleeve, a pair of hardened steel balls snugly seated in semispherical depressions in the opposite flat surfaces of said end of the leaf spring assembly, a pair of locking plates in the form of cylindrical segments seated in the spaces between said flat surfaces of the end of the leaf spring assembly and the adjacent inner surface of said cylindrical sleeve, each of said locking plates having depressions receiving the protruding portions of said steel balls, and means to retain said locking plates in said cylindrical housing comprising end caps having central openings therethrough, the edges of said openings being closely adjacent the longitudinal surfaces of said end of the leaf spring assembly.

6. Means for attaching the end of a leaf spring assembly comprising a pair of long spring leaves to a vehicle shaft comprising a cylindrical housing fixed to said shaft, a cylindrical sleeve rotatably embraced by said housing, the ends of said long spring leaves projecting into said cylindrical sleeve, a pair of hardened steel balls snugly seated in semispherical depressions in the outer flat surfaces of said ends of the long spring leaves, a pair of locking plates in the form of cylindrical segments seated in the spaces between said flat surfaces of the ends of the long spring leaves and the adjacent inner surface of said cylindrical sleeve, each of said locking plates having depressions into which the protruding portions of said steel balls project, means to retain said sleeve in said cylindrical housing comprising end caps having central openings therethrough, the edges of said openings being closely adjacent the longitudinal surfaces of said ends of the long spring leaves, and means to permit longitudinal adjustment of said leaf spring assembly relative to said shaft comprising a plurality of segmental shims interposed between the ends of said locking plates and the inner surfaces of said end caps.

7. Means for attaching the end of a leaf spring assembly comprising a pair of long spring leaves to a vehicle shaft comprising a cylindrical housing fixed to said shaft, a cylindrical sleeve rotatably embraced by said housing, the ends of said long spring leaves projecting into said cylindrical sleeve, a pair of hardened steel balls snugly seated in semispherical depressions in the outer flat surfaces of said ends of the long spring leaves, and a pair of locking plates in the form of cylindrical segments seated in the spaces between said flat surfaces of the ends of the long spring leaves and the adjacent inner surface of said cylindrical sleeve, each of said locking plates having depressions into which the protruding portions of said steel balls project, the depression in one of the locking plates being elongated in a direction axially of the leaf spring assembly.

8. Means for attaching the end of a leaf spring assembly comprising a pair of long spring leaves to an axle shaft comprising a cylindrical housing mounted on said shaft with its axis in transverse relation to the axis of the shaft, a cylindrical sleeve rotatably and coaxially journaled in said housing, the ends of said long spring leaves projecting into said cylindrical sleeve with their broad surfaces substantially parallel to the axis of the shaft, a pair of steel balls each snugly seated in a semispherical depression in the outer broad surface of an end of one of the long spring leaves, and a pair of locking plates in the form of cylindrical segments seated in the spaces between said broad surfaces of the ends of the long spring leaves and the adjacent inner surface of said cylindrical sleeve, each of said locking plates having a depression into which the protruding portion of one of said steel balls projects, the depression in the one of the locking plates most removed from the shaft comprising a groove of semicircular cross-section of a diameter to embrace the projecting portion of the ball, said groove being elongated parallel to the long axis of the leaf spring assembly.

AUGUST BENZ.

REFERENCES CITED

The following references are of record in the file of this patent:

UNITED STATES PATENTS

| Number | Name | Date |
|---|---|---|
| 591,812 | Buckley | Oct. 19, 1897 |
| 836,331 | Muir | Nov. 20, 1906 |
| 1,321,986 | Daley | Nov. 18, 1919 |
| 1,623,844 | Kogstrom | Apr. 5, 1927 |
| 1,661,530 | Field | Mar. 6, 1928 |
| 1,715,055 | Best | May 28, 1929 |
| 1,822,131 | Davis | Sept. 8, 1931 |
| 1,928,860 | Marcum | Oct. 3, 1933 |

FOREIGN PATENTS

| Number | Country | Date |
|---|---|---|
| 164,553 | Great Britain | June 16, 1921 |
| 341,459 | Great Britain | Jan. 16, 1931 |